(12) United States Patent
Mathes et al.

(10) Patent No.: US 8,880,344 B2
(45) Date of Patent: Nov. 4, 2014

(54) METHOD FOR DISPLAYING IMAGES ON A DISPLAY DEVICE AND DRIVER ASSISTANCE SYSTEM

(75) Inventors: Joachim Mathes, Heilbronn (DE); Patrice Reilhac, Esslingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/814,972

(22) PCT Filed: Jul. 25, 2011

(86) PCT No.: PCT/EP2011/062699
§ 371 (c)(1),
(2), (4) Date: Mar. 20, 2013

(87) PCT Pub. No.: WO2012/019901
PCT Pub. Date: Feb. 16, 2012

(65) Prior Publication Data
US 2013/0191022 A1     Jul. 25, 2013

(30) Foreign Application Priority Data
Aug. 12, 2010   (DE) .......................... 10 2010 034 140

(51) Int. Cl.
*G08G 1/0968* (2006.01)

(52) U.S. Cl.
USPC ....... 701/532; 701/300; 701/437; 340/995.14

(58) Field of Classification Search
CPC .... B60R 1/007; B60R 1/025; B60R 2300/00; B60R 2300/207; B60R 2300/301; B60R 2300/308; G08G 1/0968; H04N 7/188; H04N 5/2628; B01C 21/36; B01C 21/367
USPC ................ 701/532, 300, 301, 342, 437, 457; 340/435, 436, 995.14, 995.15; 348/148
See application file for complete search history.

(56) References Cited

U.S. PATENT DOCUMENTS

| 6,411,867 B1 * | 6/2002 | Sakiyama et al. ................ 701/1 |
| 6,429,789 B1 | 8/2002 | Kiridena et al. |
| 2012/0249794 A1 * | 10/2012 | Kiyo et al. .................... 348/148 |

FOREIGN PATENT DOCUMENTS

| DE | 10 2008 056 974 A1 | 5/2010 |
| EP | 1 065 642 A2 | 1/2001 |

(Continued)

OTHER PUBLICATIONS

International Search Report from PCT/EP2011/062699 mailed on Nov. 2, 2011 (6 pages).

(Continued)

*Primary Examiner* — Tan Q Nguyen
(74) *Attorney, Agent, or Firm* — Osha Liang LLP

(57) ABSTRACT

A method for displaying images (15, 18, 21) on a display device (3) of a driver assistance system (2) in a motor vehicle (1) is made available. Navigation data is received by the driver assistance system (2), and sensor data relating to the surroundings (10 to 13) of the motor vehicle (1) is acquired by at least one sensor (5a to 5d) of the driver assistance system (2). A control device (4) processes the sensor data to form a surroundings image (15, 18) which shows at least a surrounding area (16, 19) next to the motor vehicle (1'). A map image (21) which is generated while taking into account the navigation data on stored map data is displayed on the display device (3). Enlargement and/or zooming in of the map image (21) take/takes place on the display device (3). After a predetermined mapping scale (zoom factor) of the map image (21) has been reached, there is a change from the map image (21) to the surroundings image (15, 18). A driver assistance system (2) which serves to carry out the method is also made available.

17 Claims, 3 Drawing Sheets

(56) References Cited

FOREIGN PATENT DOCUMENTS

| EP | 1 283 406 | A2 | 2/2003 |
| EP | 1 862 376 | A2 | 12/2007 |
| FR | 2 902 381 | A1 | 12/2007 |

OTHER PUBLICATIONS

Search Report issued in German Patent Application No. 10 2010 034 140.1, mailing date Oct. 23, 2013, with English translation thereof (8 pages).

* cited by examiner

METHOD FOR DISPLAYING IMAGES ON A DISPLAY DEVICE AND DRIVER ASSISTANCE SYSTEM

The invention relates to a method for displaying images on a display device of a driver assistance system in a motor vehicle. The invention also relates to a driver assistance system for a motor vehicle; the driver assistance system serves to carry out the method.

Display devices for motor vehicles are known in a variety of configurations from the prior art. It is known to use displays; however, image projectors (referred to as head-up displays) with which images can be projected onto a windscreen of the motor vehicle can also be used.

The prior art also includes the use of optical cameras on a motor vehicle, said cameras capturing the surroundings of the motor vehicle. A surroundings image, showing the motor vehicle and the surroundings from a bird's eye view can then be generated on the basis of the image data of the cameras. For such a perspective illustration, the image data of all the cameras, for example image data from two, three or four cameras, are mixed and processed together. Such a surroundings image can then be displayed on the display device. The driver can then draw conclusions about the distances between the motor vehicle and the objects located in the surroundings on the basis of such a surroundings image. Collisions between the motor vehicle and objects external to the vehicle can therefore be avoided.

The interest here is in particular in a surroundings image which is generated on the basis of image data of at least one camera, and which shows from a bird's eye view a surrounding area next to the vehicle and preferably also at least one area of the motor vehicle. In this way, the surrounding area of the motor vehicle can be represented true to reality on the display device. However, such a surroundings image can also be generated on the basis of sensor data from other sensors. For example, ultrasonic data of an ultrasonic sensor can be processed to form a surroundings image which then shows the surrounding area of the motor vehicle in a schematic illustration, specifically, for example, by means of schematic symbols or by means of outlines. Radar data of a radar device and data of other sensors can also be processed in the same way.

Furthermore it is known to use a navigation receiver (for example a GPS receiver) for the purpose of navigation. Such a navigation receiver receives navigation data (GPS data), and the driver assistance system can determine the respective instantaneous global position of the motor vehicle on the basis of the navigation data. It is then possible to display on the display device a schematic map image which shows the motor vehicle and its surroundings in a schematic display. Such a map image is therefore generated on the basis of the navigation data, specifically as a function of the current global position of the motor vehicle in such a way that the instantaneous global position and the surroundings of the motor vehicle are shown on a map. Such a map image is generated from previously stored map data. This map data can either be stored in a memory of the driver assistance system or else made available online, for example on a host server. An image which is generated from the map data corresponds, as it were, to an image such as is known from the "Google Maps" application (www.maps.google.com) or else from "Google Earth". In principle, this map image can also be based on genuine optical image data, specifically on satellite images. However, this data is pre-stored and is not recorded in real time like the abovementioned image data of the cameras mounted on the motor vehicle.

For the purpose of navigation, map images which are based on stored map data and which are generated while taking into account the respective instantaneous global position of the motor vehicle are displayed on the display device. This map image therefore does include any genuine information about the surroundings of the motor vehicle in particular no information about objects and obstacles located in the surroundings. As a rule, only the road, and if appropriate, the motor vehicle itself are displayed. The necessary resolution is generally also missing.

The object of the invention is to disclose a solution in which, in a method of the generic type mentioned at the beginning, the driver can be assisted particularly reliably in driving the motor vehicle, specifically in particular by means of a single display device.

This object is achieved according to the invention by means of a method having the features according to patent claim 1, as well as also by a driver assistance system having the features of patent claim 16 as well as by a motor vehicle having the features of patent claim 17. Advantageous embodiments of the invention are the subject matter of the dependent patent claims and of the description.

A method according to the invention is configured to display images on a display device of a driver assistance system in a motor vehicle. Navigation data are received by the driver assistance system. At least one sensor of the driver assistance system acquires sensor data about the surroundings of the motor vehicle. The acquired sensor data is processed to form a surroundings image which shows at least a surrounding area next to the motor vehicle. A map image is displayed on the display device which is generated while taking into account the navigation data from stored map data. The map image on the display device is enlarged (zoomed in), and after a predetermined mapping scale (zoom factor) of the map image has been reached, there is a change from the map image to the surroundings image.

A basic idea of the present invention is therefore to change from the (schematic) map image to the (genuine) surroundings image, and this is generated on the basis of the sensor data of the sensor, if, during the enlargement of the map image, a predetermined mapping scale is reached or exceeded. The invention therefore tackles the fact that the map image—this is generated from the stored map data in advance—only provides a limited resolution and in addition does not contain any actual information about the surroundings of the motor vehicle. If the map image is then enlarged or zoomed in, the resolution is, starting from a certain map scale, so small that no information at all can be provided to the driver. Particularly here, the present invention provides a remedy in that after the predefined mapping scale or a predefined resolution has been reached, the map image is replaced at least in certain areas by the surroundings image. Starting from a certain mapping scale the schematic map image is therefore no longer displayed but instead the surroundings image, which is generated on the basis of the genuine sensor data of the at least one sensor and therefore represents the actual surroundings of the motor vehicle and/or contains information about the real surroundings. The driver can then, for example, draw conclusions about respective distances between the motor vehicle and objects which are external to the vehicle and are present in the surroundings, and can contain information about the real surroundings of the motor vehicle.

The surroundings image can also serve for the purpose of navigation, specifically after the changing of the images. This means that the navigation function is not adversely affected by the changing of the images but instead it is possible to communicate navigation information to the driver as before. This information can also be included in the surroundings image.

The sensor data contains, for example, image data which is acquired by at least one optical recording device. The optical recording device is preferably a camera, specifically, in particular, one which can detect a light in a spectral range which can be perceived by humans. The sensor data—image data—can then be processed to form such a surroundings image which shows a perspective view of the surrounding area and preferably also of at least one area of the motor vehicle. In this embodiment, a genuine image of the surroundings can therefore be displayed to the driver on the display device, which image is generated on the basis of genuine image data of a camera. This is particularly user-friendly; this is because the driver is provided with the real surroundings of the motor vehicle represented on his display device. He can, as it were, view the real surroundings of the motor vehicle on the display device. On the basis of the image data, it is possible in fact to generate a surroundings image which represents the surroundings of the motor vehicle in a way which is true to reality, and not only schematically. The use of an optical recording device, in particular of a camera, has the advantage that the surroundings image can be generated with a correspondingly high resolution. The surroundings image can then be displayed with good quality on the display device, even in the case of a relatively large mapping scale.

Additionally or alternatively, the sensor data can also comprise data of other sensors. For example, the sensor data can also include ultrasonic data of at least one ultrasonic sensor and/or radar data of at least one radar device and/or laser data of at least one laser scanner. On the basis of this sensor data, vehicle-external objects can be detected in the surroundings of the motor vehicle and schematic symbols which symbolize the detected objects can then be displayed in the surroundings image. Use of these sensors has the advantage that the processing of the sensor data can be carried out at relatively low cost, and the objects which are external to the vehicle can nevertheless be displayed on the display device in a way which is true to position and true to scale with respect to an image of the motor vehicle, specifically using the schematic symbols or outlines.

In principle, the surroundings image can therefore be generated from mixed image data of a camera and sensor data of at least one other sensor, for example a distance sensor. Such as surroundings image can therefore include both an optical image of surroundings—this image is then based on the image data—as well as schematic symbols which are generated as a function of the sensor data of a distance sensor.

After the predetermined mapping scale has been reached, there is a changeover from the map image to the surroundings image. This means, in particular, that at least one area of the map image is replaced by a corresponding area of the surroundings image. However, it proves particularly advantageous if there is a changeover from the entire map image to the entire surroundings image.

The term "enlargement" of the image is understood here to mean "zooming in" of the image. The term "mapping scale" defines a ratio between the size of the optical mapping of an object to the real size of this object. A mapping scale is therefore essentially a zoom factor.

In one embodiment there is provision that immediately after the change from the map image to the surroundings image the surroundings image shows the surrounding area and, preferably, also the at least one area of the motor vehicle from the same viewing direction and/or from the same viewing point as the map image directly before the change of images. A "viewing direction" is understood here to be that direction from which a virtual viewer is looking when viewing the image. A continuous transition from the map image to the surroundings image is therefore achieved. This also ensures that after the changing of the images at least predominantly the same surrounding area of the motor vehicle as before the changing of the images is represented. Preferably, directly before the change the mapping scale is equal, with an accuracy of +/−5%, to the mapping scale directly after the change. In other words, the mapping scale of the surroundings image directly after the change is preferably essentially equal to the mapping scale of the map image directly before the change. In this way, it is possible, after the changing of the images, to represent essentially the same surrounding area as before the change, with the result that no discontinuities are perceived between the images.

The surroundings image from above the motor vehicle preferably shows a plan view of at least one area of the motor vehicle and the surrounding area. The surrounding area preferably shows a plan view of the entire motor vehicle and the surrounding area around the motor vehicle. The driver can then particularly easily infer the respective distances between the motor vehicle and all the objects external to the vehicle around the vehicle, specifically on the basis of the surroundings image.

The sensor data can, for example, be acquired continuously and the surroundings image can be respectively re-generated continuously from the sensor data. This means that the surroundings image can, as it were, map the surroundings of the motor vehicle in real time.

In the surroundings image, the motor vehicle is preferably shown in a positionally fixed or stationary fashion on the display device, while the image of the surrounding area is preferably respectively re-generated or adapted in each case on the basis of the sensor data. The image of the motor vehicle can also be stored in advance in a memory device of the driver assistance system. This embodiment is based on the fact that the at least one sensor is generally located on an outer surface of the motor vehicle, specifically, for example, on an external bracket or on a bumper, with the result that this sensor can detect the surrounding area of the motor vehicle but not the motor vehicle itself. The image of the motor vehicle can therefore be stored in the form of data in the memory device and then the image of the surrounding area can be added thereto, specifically if the sensor data relating to the surroundings is available.

On the basis of a comparison of the navigation data with the sensor data it is also possible to perform a calibration. The global position of the motor vehicle can specifically be corrected or adapted to a more precise scale on the basis of the sensor data. It is also equally possible, additionally or alternatively, to use the navigation data to correct a viewing direction from which the surroundings image shows the surrounding area.

The changing between the images after a predetermined mapping scale of the map image has been reached therefore takes place during enlargement of the map image on the display device. The enlargement of the map image and as a result the changing between the images can take place, for example, on the basis of an input which an operator makes at an input device of the driver assistance system. For example, such an input can be performed on an operator control device. The driver assistance system then receives this input and on the basis of this input enlarges the displayed map image until the predetermined mapping scale is reached. When it is reached, the driver assistance system changes from the map image to the surroundings image. This embodiment has the advantage that the driver himself can set the mapping scale and therefore also himself decide about the changing of the images, specifically by making an input. With this input, that is to say, as it were, a stipulation of the mapping scale or the zoom factor is made.

On the basis of the navigation data, the driver assistance system can also determine that the motor vehicle has arrived at a destination and/or in a predetermined area around this destination. If the driver assistance system determines that the motor vehicle has arrived at the destination, the enlargement of the map image and as a result the changing of the images can be performed by the driver assistance system automatically on the basis of this determination. This means that there is a change from the map image to the surroundings image when the motor vehicle arrives at a predefined location—this can be predefined by the driver. In fact, generally it is only necessary to make manoeuvres of the motor vehicle at a destination, often even in very tight conditions. Particularly it is very advantageous for the driver if the surroundings image is displayed with genuine information about the surrounding area on the display device. The driver can then receive help at the destination in the manoeuvring of the motor vehicle by means of the surroundings image; in particular, the driver can track the obstacles on the basis of the surroundings image or else draw conclusions about the distances between the obstacles and the motor vehicle.

By means of the driver assistance system it is also possible to detect an object external to the vehicle in the surroundings of the motor vehicle, specifically by means of a sensor device of the driver assistance system. This sensor device may comprise, for example, at least one distance sensor, in particular an ultrasonic sensor. Said sensor device can also comprise the at least one sensor by means of which the sensor data for generating the surroundings image is acquired. The enlargement of the map image and as a result the changing from the map image to the surroundings image can then be performed on the basis of the presence of an object in the surroundings of the motor vehicle, specifically automatically by means of the driver assistance system. In this way, the actual surroundings image is then included if there is a risk of a collision between the motor vehicle and the object. The driver can then see the object external to the vehicle on the display device and correspondingly manoeuvre the motor vehicle in such a way that the collision is avoided. This may, for example, be of such a form that there is a changeover from the map image to the surroundings image if a distance between the detected object and the motor vehicle undershoots a predefined limiting value. This embodiment ensures that the vehicle occupants are safe; this is because the driver is provided with a display of the surroundings image when it is actually required owing to the presence of the object external to the vehicle in the surroundings of the motor vehicle.

The map image is generated from stored map data. The map data may be, for example, a schematic image which shows the motor vehicle and a surrounding area next to the motor vehicle in a schematic illustration. However, the map image can also be a genuine optical image which is based on images which are stored in advance, specifically, for example, on stored satellite images. The surroundings of the motor vehicle which are shown in the map image therefore do not correspond to the instantaneous state for the real surroundings. It is also possible optionally to make available various types of the map image, specifically different types of views. For example, as in "Google Maps" application, the following types of view are made available: a map view, a satellite view and a 3D view.

In one embodiment there is provision that the map image has at least one area of the surroundings image added to it. This means that the map image can also have at least one area of the surroundings image superimposed on it, or can be covered thereby. This can also take place before the predefined mapping scale is reached. As a result, the driver can have certain information displayed to him, such as for example information regarding obstacles and/or road signs and/or traffic lights and the like in the surroundings.

Preferably, either a first or a second surroundings image can be generated and displayed as a surroundings image. The selection between the first and the second surroundings images can be made according to a predetermined selection criterion. The first and the second surroundings images can differ from one another in that the first surroundings image shows the surrounding area up to a larger distance away from the motor vehicle than the second surroundings image. In this way, optionally at least two types of the surroundings image can be displayed to the driver, specifically a surroundings image with a relatively large surrounding area next to the motor vehicle and a surroundings image with a relatively small surrounding area next to the motor vehicle. The driver can therefore be assisted as required and as a function of the situation. It would therefore be possible, for example, to display the second surroundings image when the distances between the motor vehicle and the obstacles are relatively small and the driver has to perform relatively difficult manoeuvres. In contrast, the first surroundings image would be displayed when it is necessary to have a rough overview of a large surrounding area next to the motor vehicle.

The first surroundings image preferably shows the surrounding area up to a distance away from the motor vehicle in a value range from 7 m to 13 m. This distance is preferably 10 m. In particular, the first surroundings image therefore shows a plan view of the entire motor vehicle and the surrounding area around the motor vehicle, specifically up to 10 m away from the motor vehicle. The driver can therefore obtain information about a relatively large surrounding area and also see obstacles which are located relatively far away from the motor vehicle.

On the other hand, the second surroundings image can show the surrounding area up to a distance away from the motor vehicle in a value range of 50 cm to 2 m. This distance is preferably 1 m. On the basis of such a surroundings image, the driver can infer the distances between the motor vehicle and the respective obstacles located directly behind the motor vehicle with a high degree of accuracy. The driver can therefore also manoeuvre very close to obstacles with his motor vehicle without causing collisions.

As already stated, the selection between the first and the second surroundings image takes place on the basis of a predetermined selection criterion. This selection criterion may include, for example, the fact that the first surroundings image is generated and displayed directly after the change from the map image to the surroundings image, that is to say that surroundings image which shows the surrounding area up to the larger distance from the motor vehicle than the other surroundings image. In this way, it is possible to provide a continuous transition from the map image to the surroundings image.

The selection criterion can also include the fact that the first surroundings image is generated and displayed when the arrival of the motor vehicle at a destination is determined by the driver assistance system on the basis of the navigation data. If the motor vehicle arrives at a destination, as a result preferably that surroundings image which shows the relatively large surrounding area is displayed. The driver can therefore on the one hand perceive obstacles at the destination in the surroundings image which are relatively far away from the motor vehicle, and the driver can on the other hand manoeuvre with the motor vehicle without collisions.

The selection criterion can also include the fact that the second surroundings image is generated and displayed when an object external to the vehicle is detected in the surroundings of the motor vehicle by a sensor device of the driver assistance system, that is to say that surroundings image which shows the surrounding area up to the relatively small distance away from the motor vehicle. This can take place in such a way that the second surroundings image is generated and displayed when a distance between the motor vehicle and the object external to the vehicle undershoots a predefined limiting value. Particularly then, the driver requires a precise image of the surroundings directly next to the motor vehicle or in the direct vicinity of the motor vehicle. In this way, the driver can manoeuvre without collisions even in tight conditions or in very constricted locations.

In the embodiment in which the sensor data comprises image data, the image data is acquired by means of at least one optical recording device. It proves particularly advantageous if the image data is acquired by means of at least two, in particular by means of at least three, optical recording devices. It is also possible to provide a total of four optical recording devices. It is therefore possible in total to use a plurality of recording devices, specifically one recording device on a left-hand side edge and/or one recording device on a left-hand external rear view mirror and/or a recording device on a right-hand side edge and/or a recording device on a right-hand external rear view mirror and/or a recording device on a front bumper and/or one on a rear bumper of the motor vehicle or else on a tailgate. In total, the recording devices can capture a 360° image of the surroundings around the motor vehicle. The at least one recording device may be, for example, a camera, specifically in particular a CMOS (Complementary Metal Oxide Semiconductor) or a CCD (Charge-coupled Device) camera.

The at least one optical recording device preferably has a recording angle from a value range from 170° to 195°. The at least one recording device is therefore preferably a fisheye camera. In this way, it is possible to use only three or four recording devices to capture the entire surroundings around the motor vehicle. The driver assistance system therefore requires only a relatively small number of recording devices.

According to the invention, a driver assistance system for a motor vehicle is also made available. The driver assistance system comprises a navigation receiver for receiving navigation data. It also comprises at least one sensor for acquiring sensor data about the surroundings of the motor vehicle. A display device is designed to display images. The driver assistance system can process the sensor data to form a surroundings image which shows at least one surrounding area next to the motor vehicle. The driver assistance system can also generate a map image while taking into account the navigation data from stored map data, and can display the map image on the display device. The driver assistance system can enlarge the map image on the display device, and it can change from the map image to the surroundings image after a predetermined mapping scale of the map image has been reached.

A motor vehicle according to the invention comprises a driver assistance system according to the invention.

The preferred embodiments which are presented with respect to the method according to the invention and the advantages thereof apply correspondingly to the driver assistance system according to the invention and to the motor vehicle.

Further features of the invention emerge from the claims, the figures and the description of the figures. All the features and feature combinations specified in the description as well as the features and feature combinations which are mentioned below in the description of the figures and/or merely shown in the figures can be used not only in the respectively specified combination but also in the other combinations or else alone.

The invention will now be explained in more detail with reference to individual preferred exemplary embodiments, as well as with reference to the appended drawings, of which:

Figure 1:
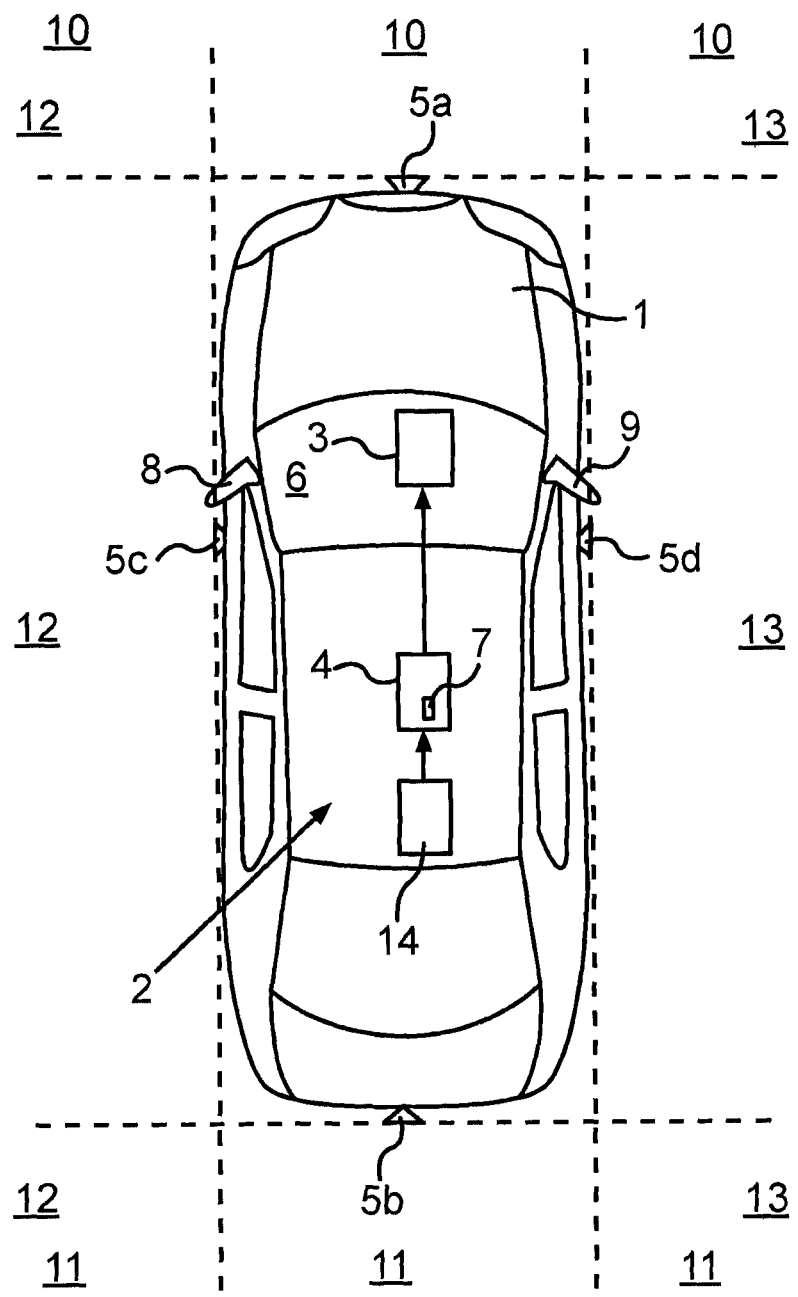
FIG. 1 is a schematic illustration of a plan view of a motor vehicle having a driver assistance system according to an embodiment of the invention.

A motor vehicle 1, as illustrated in FIG. 1, is a passenger car. The motor vehicle 1 comprises a driver assistance system 2 which comprises the following components: a display device 3, a control device 4, four cameras 5a to 5d, as well as a navigation receiver 14, for example a GPS receiver. The control device 4 actuates the display device 3. The cameras 5a to 5d transmit acquired image data to the control device 4, specifically, for example, via an internal communication bus of the motor vehicle 1. The cameras 5a to 5d are sensors, and the image data is sensor data according to the present invention.

The driver assistance system 2 can also comprise further sensors for acquiring sensor data, specifically at least one ultrasonic sensor and/or at least one radar device and/or at least one laser scanner.

The display device 3 may be, for example, a LCD display. However, it can also be an image projector by means of which images can be projected onto a windscreen 6 of the motor vehicle 1 (a Head-up-Display).

An image of the motor vehicle 1 is stored in the control device 4, specifically in a memory 7, and to be more precise data which represents an image of the motor vehicle 1 is stored.

The cameras 5a to 5d are mounted on an outer surface of the motor vehicle 1. The number and the arrangement of the cameras 5a to 5d is illustrated merely by way of example in FIG. 1; depending on the embodiment, the number of cameras 5a to 5d and the arrangement thereof on the motor vehicle 1 can vary. In the exemplary embodiment, a first camera 5a is arranged on a front bumper of the motor vehicle 1, while a second camera 5b is arranged on a rear bumper or else on a tailgate. A third camera 5c is mounted on the left-hand side edge; it can also be integrated into a left-hand external rear view mirror 8. A fourth camera 5d is mounted on the right-hand side edge, specifically in the region of a right-hand external rear view mirror 9. The fourth camera 5d can also be integrated into the external rear view mirror 9.

The cameras 5a to 5d each have a wide capturing angle and are therefore what are referred to as fisheye cameras. For example, the respective capturing angle can be in a value range from 170° to 195°. As is apparent from FIG. 1, the first camera 5a captures an area 10 in front of the motor vehicle 1, while the second camera 5b captures an area 11 behind the motor vehicle 1. Correspondingly, the third camera 5c captures an area 12 to the left next to the motor vehicle 1; the fourth camera 5d captures an area 13 to the right next to the motor vehicle 1. The cameras 5a to 5d can therefore essentially capture the entire surroundings around the motor vehicle 1, specifically a 360° image.

The control device 4 can process the image data acquired by the cameras 5a to 5d. The control device 4 can generate, on the basis of the image data, an image which shows a plan view of the surroundings of the motor vehicle 1, specifically of the captured areas 10 to 13, from above the motor vehicle 1. The control device 4 can therefore generate from the image data an image which shows a plan view of the captured areas 10 to 13 from a bird's eye view.

As already stated, an image of the motor vehicle 1 is stored in the memory 7. This image also shows the motor vehicle 1 from a bird's eye view; this image shows, in other words, a plan view of the motor vehicle 1 from above said motor vehicle. The control device 4 can generate a surroundings image from the image of the motor vehicle 1 and the image of the surroundings generated on the basis of the image data, which surroundings image shows a plan view both of the motor vehicle 1 and of the surroundings around the motor vehicle 1, specifically from a bird's eye view. In a single surroundings image, both the surroundings of the motor vehicle 1 and motor vehicle 1 itself are therefore displayed from a bird's eye view. This surroundings image can be displayed by the control device 4 on the display device 3. This surroundings image can be displayed continuously; this means that the surroundings image can be adapted continuously and/or dynamically to the surroundings of the vehicle 1. The image data are in fact continuously acquired by the cameras 5a to 5d, and the surroundings image is re-generated in each case from the continuously acquired image data. In the surroundings image, the motor vehicle 1 can be shown in a positionally fixed or stationary fashion, while the image of the surroundings can be continuously updated and adapted.

The control device 4 can also the surroundings image while taking into account sensor data of other sensors, specifically of the at least one ultrasonic sensor and/or of the at least one radar device and/or of the at least one laser scanner. For example, schematic symbols can be included in the surroundings image, which symbols are generated as a function of this sensor data and symbolize objects external to the vehicle, which are detected on the basis of the sensor data in the surroundings of the motor vehicle 1.

Figure 3:
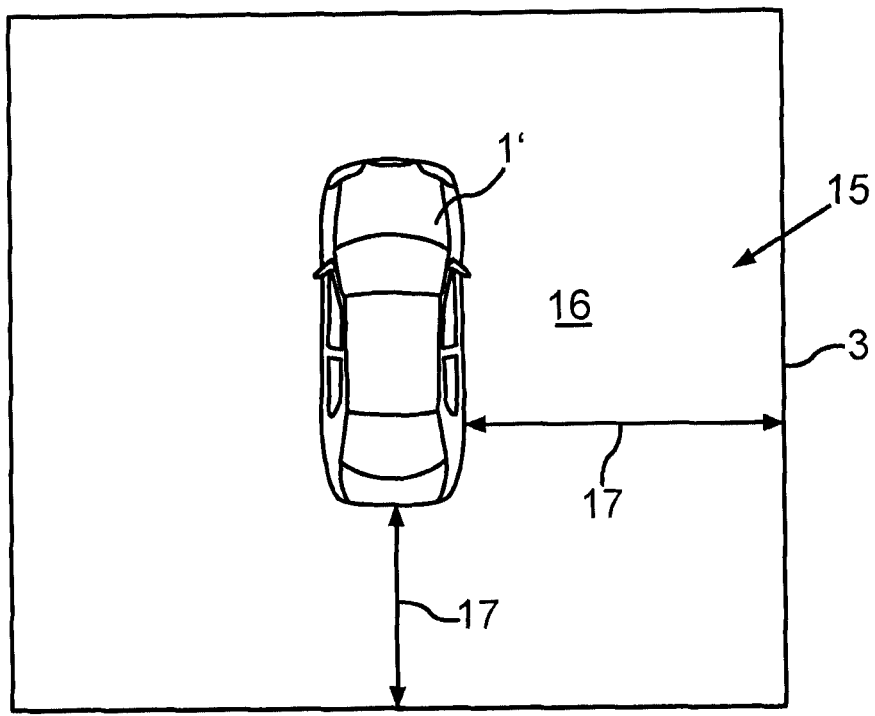
FIG. 3 is a schematic illustration of an exemplary first surroundings image.

In the exemplary embodiment, the control device 4 can in principle generate two different surroundings images, specifically from the image data of the cameras 5a to 5d and, if appropriate, also from further sensor data. The control device 4 can in fact generate a first surroundings image, as is shown by way of example in the schematic illustration in FIG. 3 and noted by 15. The first surroundings image 15 can be displayed on the display device 3. The first surroundings image 15 shows a plan view of the motor vehicle 1' and a surrounding area 16 around the motor vehicle 1', from a bird's eye perspective. Although it is not illustrated in more detail in FIG. 3, in the surroundings image 15 the real surrounding area 16 is represented or displayed in a way true to reality. This is because the cameras 5a to 5d captured the real surroundings around the motor vehicle 1 and the control device 4 respectively re-generates the surroundings image 15 in real time from the image data. The first surroundings image 15 is denoted by the fact that it shows the surrounding area 16 up to a distance 17 away from the motor vehicle 1' in a value range of 7 m to 13 m. The first surroundings image 15 can show the surrounding area 16 laterally next to the motor vehicle 1' up to a distance 17 of 10 m or 11 m, while the surrounding area 16 behind and in front of the motor vehicle 1' can be shown up to a distance 17 of 8 m or 9 m. In comparison with known images from a bird's eye view, the first surroundings image 15 therefore shows an extended surrounding area 16, which extends away from the motor vehicle 1' up to a relatively large distance 17.

The first surroundings image 15 can in principle be generated in two different ways: on the one hand, exclusively the respectively instantaneous acquired image data can be used to generate the surroundings image 15. Alternatively, if the surrounding area 16 cannot be captured up to the distance 17, the surroundings image 15 can be generated both from the instantaneously acquired image data and from the previously acquired image data. According to this alternative, the surroundings image 15 can therefore be generated by means of odometry.

Figure 4:
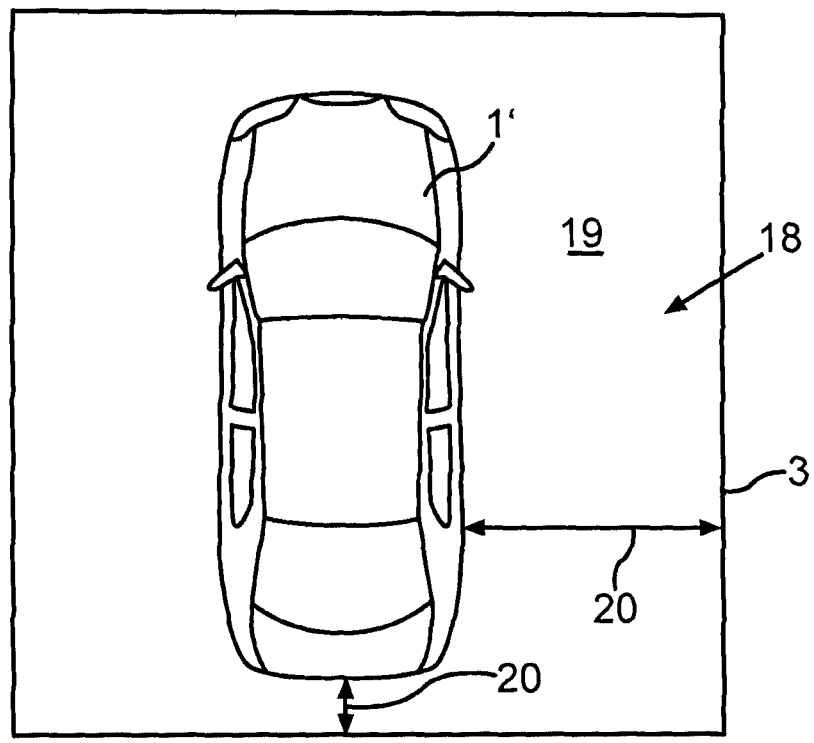
FIG. 4 is a schematic illustration of an exemplary second surroundings image.

The control device 4 can furthermore generate a second surroundings image 18 such as is shown by way of example in FIG. 4 in a schematic illustration. This second surroundings image 18 also shows a plan view of the motor vehicle 1' and a surrounding area 19 around the motor vehicle 1' from a bird's eye view. The surroundings image 18 also shows a real image of the surrounding area 19, even though this is not explicitly displayed in FIG. 4. As is apparent from FIG. 4, the image of the motor vehicle 1' in FIG. 4 is larger than the image of the motor vehicle 1' in the first surroundings image 15 according to FIG. 3. This is due to the fact that the second surroundings image 18 shows the surrounding area 19 only up to a relatively short distance 20 away from the motor vehicle 1'. This distance 20 can be, for example, in a value range from 50 cm to 2 m. For example, the second surroundings image 18 can show the surrounding area 19 laterally next to the motor vehicle 1' up to a distance 20 of 1.5 m, while the surrounding area 19 behind and in front of the motor vehicle 1' can be shown up to a distance 20 of 50 cm. On the basis of the second surroundings image 18, the driver can therefore determine respective distances between the motor vehicle 1 and obstacles external to the vehicle which are present in the surrounding area 19 with a high degree of accuracy.

The first and the second surroundings images 15, 18 can be optionally displayed on the display device 3; this means either the first surroundings image 15 or the second surroundings image 18 can be displayed.

Figure 2:
FIG. 2 is a schematic illustration of an exemplary map image.

As already stated, the driver assistance system 2 also includes a navigation receiver 14, here a GPS receiver, which receives navigation data (GPS data). This navigation data includes information about the global position of the motor vehicle 1; this means that the control device 4 can infer the respective instantaneous global position of the motor vehicle 1 on the basis of the navigation data. Depending on the current global position of the motor vehicle 1, the control device 4 can also generate a map image 21 and display it on the display device 3. An exemplary map image 21 is shown in FIG. 2 in a schematic illustration. The control device 4 can generate the map image 21 from stored map data which can be stored, for example, in the memory 7 of the control device 4 or else made available online. The map image 21 shows the respective instantaneous global position of the motor vehicle 1, as also the road travelled on by the motor vehicle 1 and, if appropriate, also further roads as well as further devices and buildings present in the surroundings of the motor vehicle 1. The map image 21 is also an aerial view, i.e. it shows the surroundings of the motor vehicle 1 from a bird's eye view. However, the map image 21 does not show the real surroundings of the motor vehicle 1 and does not show the instantaneous actual state of the surroundings. This is because the map image 21 is based on stored map data which cannot be generated in real time. The map image 21 can, if appropriate, also be based on satellite images which can be stored as pre-stored image data in the memory 7.

However, the map image 21 does not provide the desired resolution, in particular not when this map image 21 is to be significantly enlarged on the display device 3. If the map image 21 is zoomed in up to a relatively large mapping scale or zoom factor owing, for example, to an input by the driver, the resolution 21 is so low that the driver cannot do very much with the map image 21. Furthermore, the map image 21 does not contain any actual information about the real instantaneous surroundings of the motor vehicle 1. For example, no obstacles which are instantaneously located in the surroundings can be displayed in the map image 21. It is therefore provided in the exemplary embodiment that during the enlargement or during the zooming in of the map image 21 after a predetermined mapping scale (zoom factor) or a predetermined resolution has been reached, there is a changeover from the map image 21 to one of the surroundings images 15, 18. The driver is then provided with a surroundings image 15, 18 displayed on the display device 3, which surroundings image 15, 18 has both a significantly better resolution than the map image 21 and also includes information true to reality about the instantaneous surroundings of the motor vehicle 1.

Figure 5:
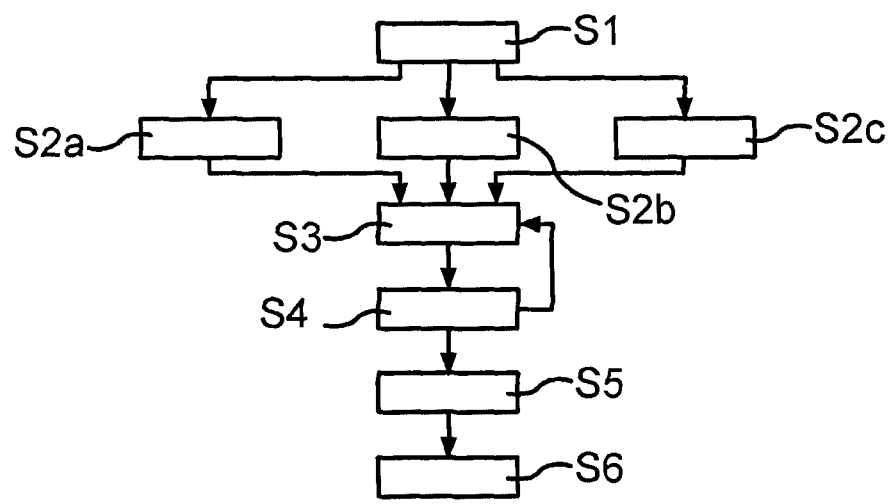
FIG. 5 is a flowchart of a method according to an embodiment of the invention.

With respect to FIG. 5, a method according to an embodiment of the invention will be explained in more detail below. The method starts in a first step S1 in which the control device 4 generates a map image 21 from stored maps and displays it on the display device 3. The map image 21 shows the current global position of the motor vehicle 1 on a map.

In a subsequent step, the control device 4 checks whether or not the map image 21 on the display device 3 is to be zoomed in or enlarged. Specifically, the control device 4 checks in a step S2a whether or not an input for enlarging the map image 21 is being performed by an operator, specifically on an input device of the driver assistance system 2. In parallel or at the same time, the control device 4 checks in a step S2b whether the motor vehicle 1 has arrived at a predefined location, for example in a predefined town or else in a predefined road. In parallel or at the same time, the control device 4 checks, specifically in step S2c, whether an object which is external to the vehicle has arrived in a predefined surrounding area of the motor vehicle 1.

If an input for enlarging the map image 21 is detected and/or if the motor vehicle 1 has arrived at the destination and/or if an object is detected in the predefined surrounding area of the motor vehicle 1, the map image 21 on the display device 3 is enlarged or zoomed by means of the control device 4. The enlargement takes place in step S3. In a subsequent step S4, the control device 4 checks whether or not a predefined mapping scale of the map image 21 or a predefined resolution has been reached. If the predefined mapping scale has not yet been reached, the method returns to step S3 and the map image 21 is enlarged further. If the predefined mapping scale is reached in step S4, in a subsequent step S5 an evaluation of a selection criterion takes place, according to which a selection is made between the first surroundings image 15 or the second surroundings image 18. The selected image is then displayed in step S6 on the display device 3; there is a changeover from the map image 21 to the surroundings image 15 or 18.

The content of the selection criterion is that:
in step S6 there is firstly a changeover from the map image 21 to the first surroundings image 15 when the enlargement of the map image 21 takes place on the basis of an input by the driver, and/or there is a changeover from the map image 21 to the first surroundings image 15 when the enlargement of the map image 10 takes place on the basis of the arrival of the motor vehicle 1 at the destination, and/or there is a changeover from the map image 21 directly to the second surroundings image 18 or indirectly via the surroundings image 15 to the second surroundings image 18 when an object which is external to the vehicle is detected in the predefined surrounding area of the motor vehicle 1.

It can generally also be the case that there can be a changeover from the map image 21 to the second surroundings image 18 only indirectly via the first surroundings image 15, with the result that a continuous transition between the images takes place.

At the transition from the map image 21 to the surroundings images 15, 18, it is also ensured that directly after the change the surroundings image 15, 18 is shown from the same viewing direction and same viewpoint as the map image 21 directly before the change. It is also possible to provide that directly after the change the distance up to which the surrounding area away from the motor vehicle 1 is shown is equal to the distance directly before the change. In this way it is possible to achieve a continuous and uninterrupted transition between the images.

The invention claimed is:

1. A method for displaying images on a display device of a driver assistance system in a motor vehicle, comprising:
reception of navigation data by the driver assistance system;
acquisition of sensor data about surroundings of the motor vehicle by at least one sensor of the driver assistance system;
processing of the sensor data to form a surroundings image which shows at least one surrounding area next to the motor vehicle;
displaying of a map image on the display device, wherein the map image is generated as a function of the navigation data from stored map data;
enlargement of the map image on the display device; and
changing from the map image to the surroundings image after a predetermined mapping scale of the map image has been reached.

2. The method according to claim 1, wherein the sensor data comprises image data which is acquired by at least one optical recording device as a sensor, wherein the image data is processed to form the surroundings image which shows a perspective view of the surrounding area and of at least one area of the motor vehicle.

3. The method according to claim 1, wherein the sensor data comprises ultrasonic data which is acquired by at least one ultrasonic sensor, and/or radar data which is acquired by at least one radar device as a sensor, and/or laser data which is acquired by at least one laser scanner as a sensor.

4. The method according to claim 1, wherein immediately after the change from the map image to the surroundings image, the surroundings image shows the surrounding area and the at least one area of the motor vehicle from a same viewing direction as the map image directly before the change.

5. The method as claimed in claim 1, wherein the surroundings image from above the motor vehicle shows a plan view of an entirety of the motor vehicle and the surrounding area, and the surrounding area around the motor vehicle.

6. The method according to claim 1, wherein the enlargement of the map image and, as a result, the changing of the images take place on the basis of an input which an operator makes at an input device of the driver assistance system.

7. The method according to claim 1, wherein, on the basis of the navigation data, arrival of the motor vehicle at a destination is determined by the driver assistance system, and the enlargement of the map image and, as a result, the changing of the images are performed by the driver assistance system on the basis of the determination.

8. The method according to claim 1, wherein a sensor device of the driver assistance system detects an object external to the vehicle in the surroundings, and the enlargement of the map image and, as a result, the changing of the images by the driver assistance system are performed on the basis of a presence of the object in the surroundings.

9. The method according to claim 1, wherein the map image is supplemented with at least one area of the surroundings images.

10. The method according to claim 1, wherein either a first surroundings image or a second surroundings image is generated as a surroundings image according to a predetermined selection criterion, wherein the first and the second surroundings images differ from one another in that the first surroundings image shows the surrounding area up to a larger distance away from the motor vehicle than the second surroundings image.

11. The method according to claim 10, wherein the first surroundings image shows the surrounding area up to a distance away from the motor vehicle in a value range from 7 m to 13 m.

12. The method according to claim 10, wherein the second surroundings image shows the surrounding area up to a distance away from the motor vehicle in a value range from 50 cm to 2 m.

13. The method according to claim 10, wherein the selection criterion includes the fact that the first surroundings image is generated directly after the change from the map image to the surroundings image.

14. The method according to claim 10, wherein the selection criterion includes the fact that the first surroundings image is generated when arrival of the motor vehicle at a destination is determined by the driver assistance system on the basis of the navigation data.

15. The method according to claim 10, wherein the selection criterion includes the fact that the second surroundings image is generated when an object external to the vehicle is detected in the surroundings of the motor vehicle by a sensor device of the driver assistance system.

16. A driver assistance system for a motor vehicle, comprising:
- a navigation receiver for receiving navigation data;
- at least one sensor for acquiring sensor data about the surroundings of the motor vehicle; and
- a display device for displaying images;
- wherein the driver assistance system is configured to:
  - process the sensor data to form a surroundings image which shows at least one surrounding area next to the motor vehicle,
  - generate a map image while taking into account the navigation data from stored map data, and to display the map image on the display device, and
  - to enlarge the map image on the display device and to change from the map image to the surroundings image after a
  - predetermined mapping scale of the map image has been reached.

17. A motor vehicle having a driver assistance system according to claim 14.

* * * * *